(12) United States Patent
Oh

(10) Patent No.: US 10,203,908 B2
(45) Date of Patent: Feb. 12, 2019

(54) CONTROLLER, MEMORY SYSTEM AND OPERATING METHOD THEREOF

(71) Applicant: SK hynix Inc., Gyeonggi-do (KR)

(72) Inventor: Ik-Sung Oh, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 6 days.

(21) Appl. No.: 15/499,444

(22) Filed: Apr. 27, 2017

(65) Prior Publication Data

US 2018/0067692 A1 Mar. 8, 2018

(30) Foreign Application Priority Data

Sep. 7, 2016 (KR) .................. 10-2016-0114931

(51) Int. Cl.
*G06F 3/06* (2006.01)
*G06F 12/02* (2006.01)

(52) U.S. Cl.
CPC ............ *G06F 3/0656* (2013.01); *G06F 3/061* (2013.01); *G06F 3/0626* (2013.01); *G06F 3/0679* (2013.01); *G06F 3/0688* (2013.01); *G06F 12/0246* (2013.01); *G06F 2212/1021* (2013.01); *G06F 2212/69* (2013.01); *G06F 2212/7201* (2013.01)

(58) Field of Classification Search
CPC ............... G06F 12/0246; G06F 3/0679; G06F 2212/7201; G06F 3/0616; G06F 3/0653; G06F 2212/7211; G06F 3/061; G06F 12/10; G06F 2212/2022; G06F 3/0688; G06F 2212/1036; G06F 12/0253; G06F 12/0891; G06F 2212/7205; G06F 2212/214; G06F 2212/651; G06F 12/122

See application file for complete search history.

(56) References Cited

U.S. PATENT DOCUMENTS

| | | | |
|---|---|---|---|
| 2011/0179219 A1* | 7/2011 | Ma | G06F 3/0613 711/103 |
| 2014/0215156 A1 | 7/2014 | Park | |
| 2015/0019794 A1* | 1/2015 | Byun | G06F 12/0246 711/103 |
| 2016/0335181 A1* | 11/2016 | Wang | G06F 3/0638 |

FOREIGN PATENT DOCUMENTS

| | | |
|---|---|---|
| KR | 100998212 | 12/2010 |
| KR | 1020160033737 | 3/2016 |

* cited by examiner

*Primary Examiner* — Reginald G Bragdon
*Assistant Examiner* — Thanh D Vo
(74) *Attorney, Agent, or Firm* — IP & T Group LLP

(57) ABSTRACT

A controller may include a first map buffer and a second map buffer suitable for storing map data and hit counts respectively corresponding to the map data, wherein each of the hit counts represents a number of accesses to data stored in a memory device by using a corresponding one among the map data, and wherein the controller swaps the map data and corresponding hit counts between the first and second map buffers such that the first map buffer stores relatively higher hit counts and corresponding map data than the second map buffer.

14 Claims, 8 Drawing Sheets

CONTROLLER, MEMORY SYSTEM AND OPERATING METHOD THEREOF

CROSS-REFERENCE TO RELATED APPLICATION

This U.S. non-provisional patent application claims priority under 35 U.S.C. § 119(a) to Korean Patent Application No. 10-2016-0114931 filed on Sep. 7, 2016 in the Korean Intellectual Property Office (KIPO), the disclosure of which is incorporated herein by reference in its entirety.

TECHNICAL FIELD

Exemplary embodiments of the present invention relate to a controller which processes data to and from a memory device, and an operating method thereof.

DISCUSSION OF THE RELATED ART

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a controller and an operating method thereof, capable of minimizing complexity and performance deterioration of a memory system and maximizing use efficiency of a memory device, thereby quickly and stably processing data with respect to the memory device.

In an exemplary embodiment of the present invention, a controller for a memory system, the controller may include: a first map buffer and a second map buffer suitable for storing map data and hit counts respectively corresponding to the map data, wherein each of the hit counts represents a number of accesses to data stored in a memory device by using a corresponding one among the map data, and wherein the controller swaps the map data and corresponding hit counts between the first and second map buffers such that the first map buffer stores relatively higher hit counts and corresponding map data than the second map buffer.

Preferably, the controller may swap the lowest hit counts and corresponding map data of the first map buffer and the highest hit counts and corresponding map data of the second map buffer.

Preferably, the controller may swap the map data and corresponding hit counts when a new hit count and corresponding map data are stored in the first map buffer.

Preferably, the controller may swap the map data and corresponding hit counts during an idle state.

Preferably, the controller may delete the map data and corresponding hit counts from the second map buffer in order for the second map buffer to buffer data other than the map data and corresponding hit counts.

Preferably, the controller may delete the controller deletes the map data and corresponding hit counts from the second map buffer in a background state.

Preferably, the background state may be one among states of a garbage collection operation, a wear leveling operation, a map flush operation and a bad block management operation.

In an exemplary embodiment of the present invention, an operation method of a controller for a memory system, the method may include: storing map data and hit counts respectively corresponding to the map data into a first map buffer and a second map buffer; and swapping the map data and corresponding hit counts between the first and second map buffers such that the first map buffer stores relatively higher hit counts and corresponding map data than the second map buffer, wherein each of the hit counts represents a number of accesses to data stored in a memory device by using a corresponding one among the map data.

Preferably, the swapping of the map data and corresponding hit counts may include swapping the lowest hit counts and corresponding map data of the first map buffer and the highest hit counts and corresponding map data of the second map buffer.

Preferably, the swapping of the map data and corresponding hit counts may be performed when a new hit count and corresponding map data are stored in the first map buffer.

Preferably, the swapping of the map data and corresponding hit counts may be performed during an idle state.

Preferably, the operation method may further comprise deleting the map data and corresponding hit counts from the second map buffer in order for the second map buffer to buffer data other than the map data and corresponding hit counts.

Preferably, the deleting of the map data and corresponding hit counts from the second map buffer may be performed in a background state.

Preferably, the background state may be one among states of a garbage collection operation, a wear leveling operation, a map flush operation and a bad block management operation.

In an exemplary embodiment of the present invention, a memory system may include: a memory device suitable for storing data; and a controller, wherein the controller includes a first map buffer and a second map buffer suitable for storing map data and hit counts respectively corresponding to the map data, wherein the controller swaps the map data and corresponding hit counts between the first and second map buffers such that the first map buffer stores relatively higher hit counts and corresponding map data, and wherein each of the hit counts represents a number of accesses to data stored in a memory device by using a corresponding one among the map data.

Preferably, the controller may swap the lowest hit counts and corresponding map data of the first map buffer and the highest hit counts and corresponding map data of the second map buffer.

Preferably, the controller may swap the map data and corresponding hit counts when a new hit count and corresponding map data are stored in the first map buffer.

Preferably, the controller may swap the map data and corresponding hit counts during an idle state.

Preferably, the controller may delete the map data and corresponding hit counts from the second map buffer in order for the second map buffer to buffer data other than the map data and corresponding hit counts.

Preferably, the controller may delete the map data and corresponding hit counts from the second map buffer in a background state.

In accordance with various embodiments of the present invention, data stored in memory cells of a semiconductor memory device may be precisely read.

BRIEF DESCRIPTION OF THE DRAWINGS

These and other features and advantages of the present invention will become apparent to those skilled in the art to which the present invention pertains from the following detailed description in reference to the accompanying drawings.

DETAILED DESCRIPTION

Figure 1:
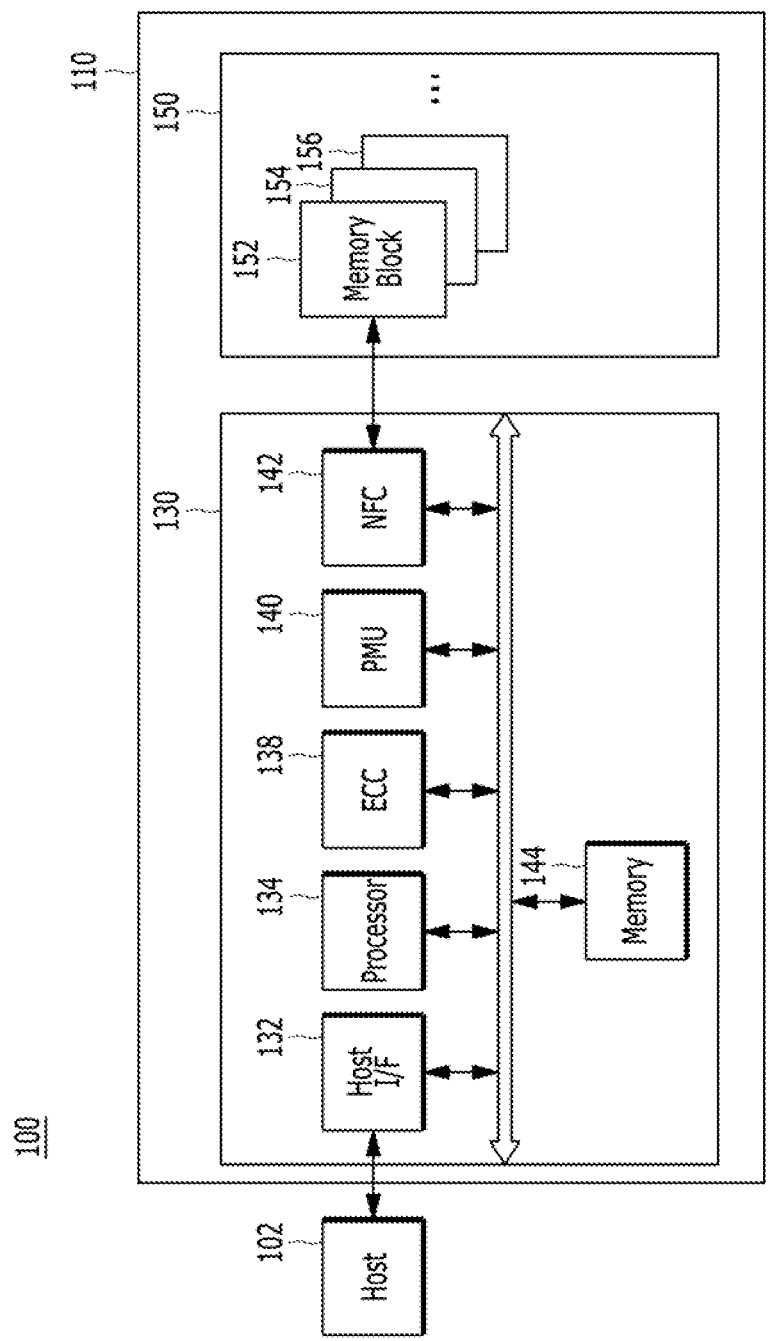
FIG. 1 is a block diagram illustrating a data processing system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The host 102 may include at least one OS (operating system). The OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110. The memory system 110 may operate to store data for the host 102 in response to a request of the host 102. Non-limited examples of the memory system 110 may include solid state drive (SSD), multi-media card (MMC), secure digital (SD) card, universal storage bus (USB) device, universal flash storage (UFS) device, compact flash (CF) card, smart media card (SMC), personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied by various types of storage devices. Non-limiting examples of storage devices included in the memory system 110 may include volatile memory devices such as DRAM dynamic random access memory (DRAM) and static RAM (SRAM) and nonvolatile memory devices such as read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magneto-resistive RAM (MRAM), resistive RAM (RRAM) and flash memory. The flash memory may have a 3-dimensioanl (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even when power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each memory block including a plurality of pages, and each page including a plurality of memory cells coupled to a word line. In an embodiment, the memory device 150 may be a flash memory having a 3-dimensional (3D) stack structure.

The controller 130 may control the memory device 150 in response to a request from the host 102. The controller 130 may control read, write, program and erase operations of the memory device 150. For example, the controller 130 may provide data read from the memory device 150 to the host 102, and store data provided from the host 102 into the memory device 150.

The controller 130 may include a host interface (I/F) unit 132, a processor 134, an error correction code (ECC) unit 138, a Power Management Unit (PMU) 140, a memory device controller such as a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The memory device controller 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory device controller 142 may be an NFC. The memory device controller 142 may generate a control signal for the memory device 150 and process data to be provided to the memory device 150 under the control of the processor 134. The memory device controller 142 may work as an interface (e.g., a NAND flash interface) for processing a command and data between the controller 130 and the memory device 150. Specifically, the memory device controller 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may impact the use efficiency of the memory device 150 and the reliability of the memory system 110. Thus, the bad block management operation needs to be performed with more reliability.

Figure 2:
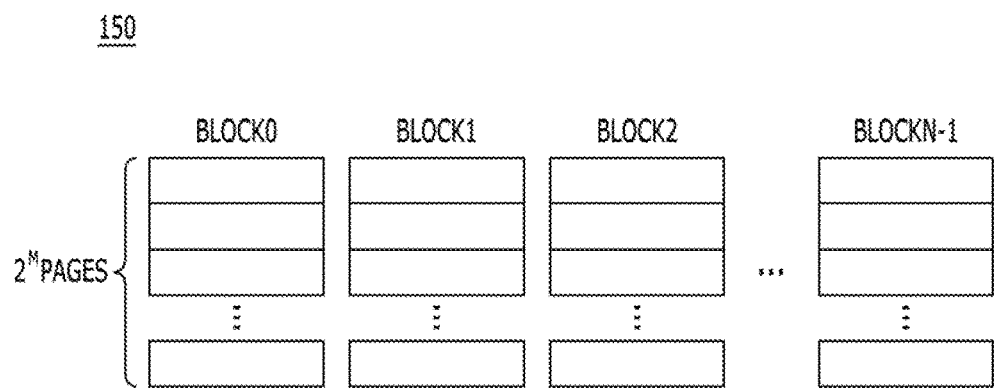
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2- or more bit data. An MLC storing 3-bit data is also referred to as a triple level cell (TLC), and an MLC storing 4-bit data is also referred to as a quadruple level cell (QLC).

Figure 3:
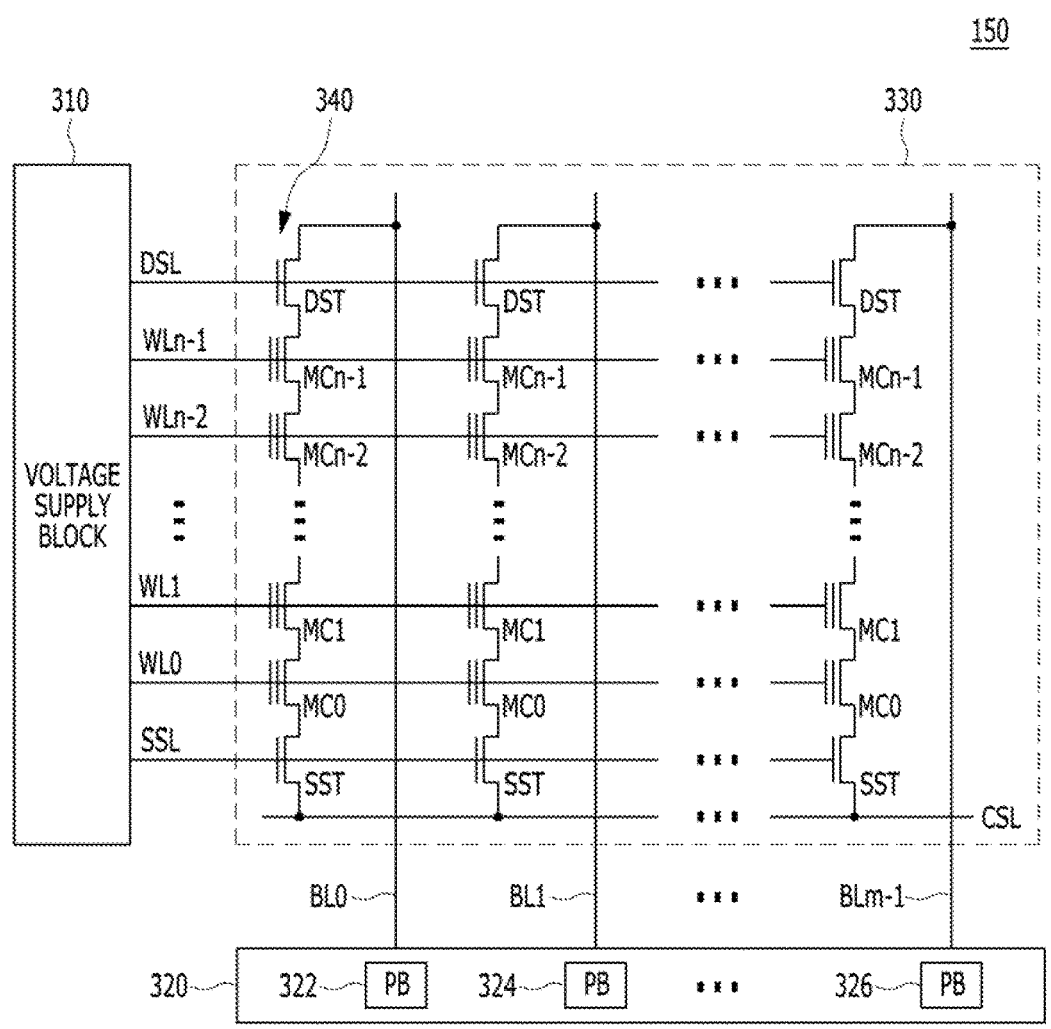
FIG. 3 is a circuit diagram illustrating an exemplary configuration of a memory cell array of a memory block in a memory device of FIG. 1.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
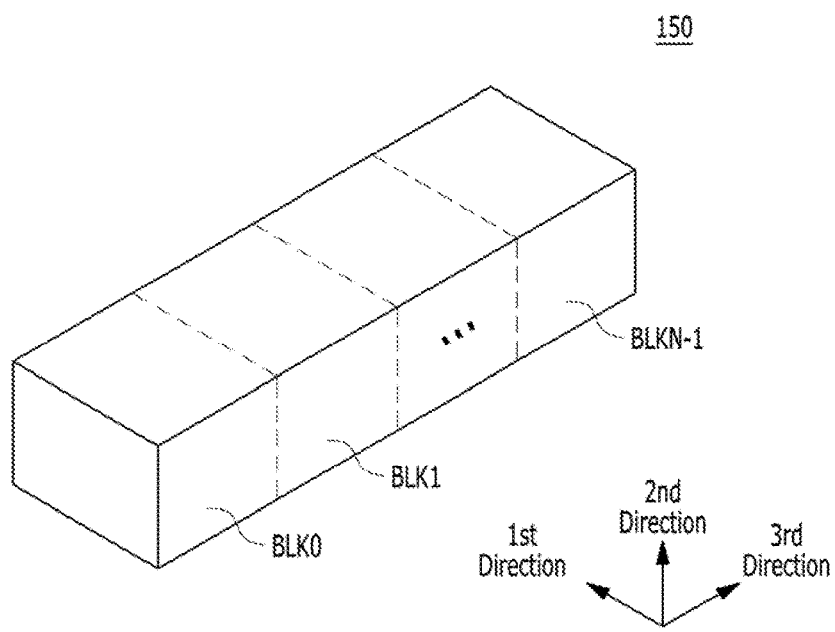
FIG. 4 is a schematic diagram illustrating an exemplary 3-D structure of a memory device of FIG. 1.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each of the memory blocks having a 3D structure (or vertical structure).

Figure 5:
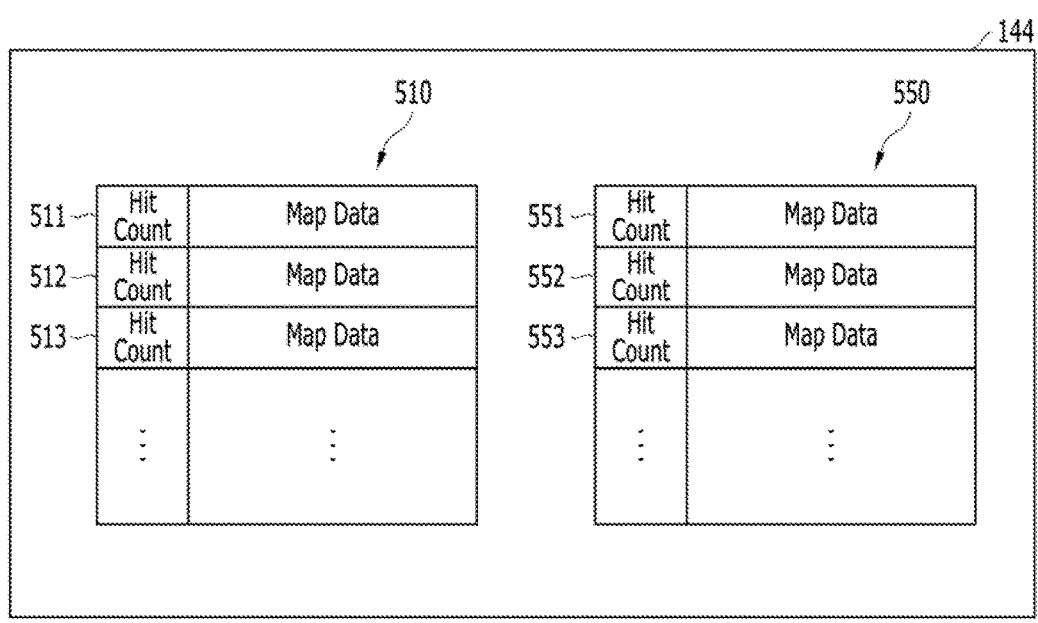
FIG. 5 is a schematic diagram illustrating a memory of a memory system of FIG. 1.

FIG. 5 illustrates the memory 144 of the controller 130 included in the memory system 110 in accordance with an embodiment of the present invention.

Referring to FIG. 5, the memory 144 may include a first buffer 510 and a second buffer 550 for storing map data and hit counts. The first buffer 510 may include a plurality of segments 511 to 513 for storing map data and hit counts. The second buffer 550 may include a plurality of segments 551 to 553 for storing map data and hit counts.

The map data may include an L2P map data having logical to physical (L2P) information and a P2L map data having physical to logical (P2L) information for data stored in the memory blocks 0 to N−1 of the memory device 150.

That is, the map data may have information of mapping relation between a logical address and a physical address of data stored in the memory blocks 0 to N−1. The map data may be stored in the memory blocks 0 to N−1. At least some of the map data may also be stored or inserted in the plurality of segments 511 to 513 and 551 to 553 of the first and second buffers 510 and 550, respectively.

A hit count represents the number of accesses to the data stored in the memory blocks 0 to N−1 through the map data stored in the plurality of segments 511 to 513 and 551 to 553 of the first and second buffers 510 and 550. The hit counts for the map data may be stored together with the corresponding map data in the plurality of segments 511 to 513 and 551 to 553 of the first and second buffers 510 and 550 as exemplified in FIG. 5. Alternatively, the hit counts the map data may be stored in a hit count table provided separately from the first and second buffers 510 and 550.

The controller 130 may control the memory system 110 to operate more efficiently by managing and utilizing the first and second buffers 510 and 550 in different way in foreground and background states of the memory system 110. In a foreground state, the memory system 110 may perform a command operation in response to a command provided from the host 102. For example, a command operation may be a read or a write operation. In a background state, the memory system 110 may not be provided with a command from the host 102.

Even in a background state of the memory system 110, the controller 130 may control the memory system 110 to operate more efficiently by managing and utilizing the first and second buffers 510 and 550 in a different way depending on a particular state of the memory system 110. Examples of a background state of the memory system 110 may be a garbage collection (GC) state, in which data stored in the memory blocks 0 to N−1 of the memory device 150 is copied to an arbitrary memory block, a wear leveling (WL) state, in which data stored in the memory blocks 0 to N−1 are swapped, a map flush state, in which the map data stored in the first and second buffers 510 and 550 is moved into the memory blocks 0 to N−1 of the memory device 150, a bad block management state, in which a bad block included in the memory device 150 is identified and processed, and so forth.

Hereinafter, described will be an operation of the controller 130 to the first and second buffers 510 and 550 when the memory system 110 is in a foreground state when the controller 130 receives a command from the host 102.

When one or more map data of one or more data corresponding to the command provided from the host 102 are stored in one or more of the plurality of segments 511 to 513 and 551 to 553 of the first and second buffers 510 and 550, the controller 130 may access the one or more data stored in one or more of the memory blocks 0 to N−1 by using the one or more corresponding map data stored or inserted in the plurality of segments 511 to 513 and 551 to 553 of the first and second buffers 510 and 550. When accessing the one or more data corresponding to the provided command by using the one or more corresponding map data stored or inserted in the plurality of segments 511 to 513 and 551 to 553 of the first and second buffers 510 and 550, the controller 130 may update the hit count by increasing the value of the hint count by one (1) for each of the one or more map data which are used during the command operation in response to the provided command of the host.

When the map data of data corresponding to the command provided from the host 102 is not stored in the plurality of segments 511 to 513 and 551 to 553 of the first and second buffers 510 and 550, the controller 130 may access data stored in the memory blocks 0 to N−1 by using the map data stored in the memory blocks 0 to N−1. When accessing the data corresponding to the provided command by using the map data stored in the memory blocks 0 to N−1, the controller 130 may then insert and store the map data used during the command operation in response to the provided command of the host 102 into the plurality of segments 511 to 513 and 551 to 553 of the first and second buffers 510 and 550, and initialize the hit count corresponding to the newly inserted map data into the plurality of segments 511 to 513 and 551 to 553 of the first and second buffers 510 and 550, to a value of one (1).

When it is required to delete or discard map data which are already stored in the plurality of segments 511 to 513 and 551 to 553 of the first and second buffers 510 and 550 in order to store newly inserted map data into the plurality of segments 511 to 513 and 551 to 553 of the first and second buffers 510 and 550, the controller 130 may selectively delete the map data having the lowest hit count among the map data already stored in the plurality of segments 511 to 513 and 551 to 553 of the first and second buffers 510 and 550.

When it is required to delete or discard map data already stored in the plurality of segments 511 to 513 and 551 to 553 of the first and second buffers 510 and 550 in order to store new map data into the plurality of segments 511 to 513 and 551 to 553 of the first and second buffers 510 and 550, the controller 130 may compare the hit count of the map data stored in the first map buffer 510 with the hit count of the map data stored in the second map buffer 550, and may control the first and second buffers 510 and 550 such that the first map buffer 510 stores the map data of higher hit count than the map data stored in the second map buffer 550.

In more detail, when there is map data having the lowest hit count among the map data stored in the segments 551 to 553 of the second map buffer 550, the controller 130 may delete or discard the map data having the lowest hit count among the map data stored in the segments 551 to 553 of the second map buffer 550, and may store or insert new map data into the segment, in which the map data is deleted. However, when there is map data having the lowest hit count among the map data stored in the segments 511 to 513 of the first map buffer 510, the controller 130 may delete or discard the map data having the lowest hit count among the map data stored in the segments 511 to 513 of the first map buffer 510, may store or insert new map data into the segment, in which the map data is deleted, and may swap the map data having the lowest hit count among the map data store in the segments 511 to 513 of the first map buffer 510 and the map data having the highest hit count among the map data stored in the segments 551 to 553 of the second map buffer 550.

Accordingly, when data buffering is required more for an operation during a foreground state or a background state, the memory system 110 may operate more efficiently by deleting the map data and corresponding hit count from the second map buffer 550 storing the map data having relatively lower hit count, and utilizing the second map buffer 550 for the operation requiring more data buffering. Further, a command provided from the host 102 may be processed more rapidly since the first map buffer 510 may still store map data having relatively higher hit count even when map data and their corresponding hit count are deleted from the second map buffer 550.

Figure 6:
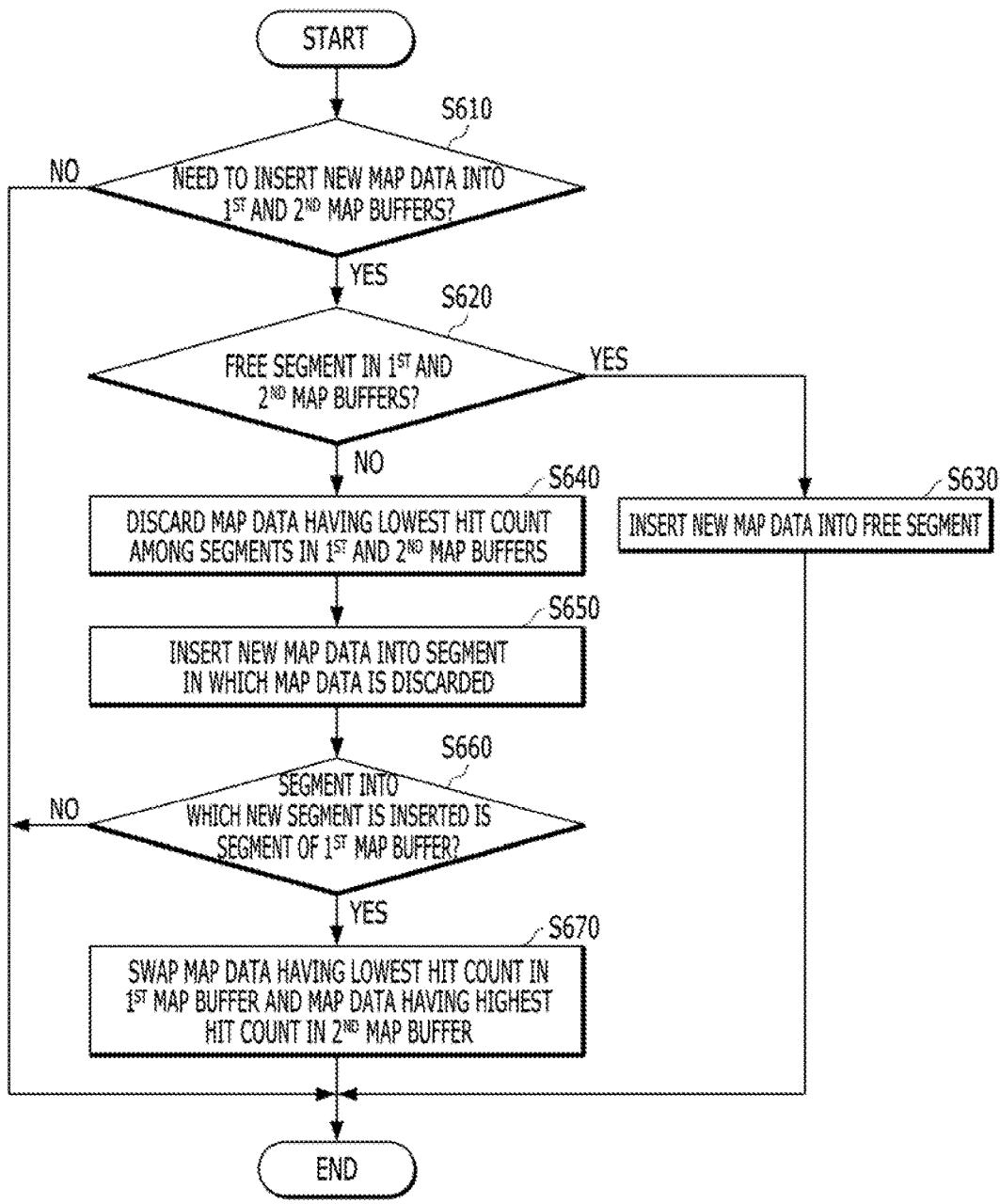
FIG. 6 is a flow chart illustrating an operation of a controller of FIG. 1.

FIG. 6 is a flow chart illustrating an operation of the controller 130 according to an embodiment of the present invention.

Referring to FIG. 6, at step S610, the controller 130 may determine whether to insert new map data into the plurality of segments 511 to 513 and 551 to 553 of the first and second buffers 510 and 550. In detail, when the controller 130 processes a command received from the host 102 by using the map data stored in the memory blocks 0 to N−1, the controller 130 may determine to insert new map data into the plurality of segments 511 to 513 and 551 to 553 of the first and second buffers 510 and 550.

When it is determined to insert new map data into the plurality of segments 511 to 513 and 551 to 553 of the first and second buffers 510 and 550 as a result of step S610, the controller 130 may detect a free segment, which does not store any map data, in the first and second buffers 510 and 550 at step S620. When it is determined not to insert new map data into the plurality of segments 511 to 513 and 551 to 553 of the first and second buffers 510 and 550 as a result of step S610, the controller 130 may end the process of storing the map data.

When the controller 130 detects the free segment in the first and second buffers 510 and 550 as a result of step S620, the controller 130 may store the new map data into the detected free segment at step S630. When the controller 130 stores the new map data into the detected free segment, the controller 130 may initialize the hit count, which corresponds to the newly stored map data, to have a value of one (1). For example, when the controller 130 stores the new map data into a segment 511, the controller 130 may initialize the hit count, which corresponds to the newly stored map data of the segment 511, to have a value of one (1).

When the controller 130 does not detect a free segment in the first and second buffers 510 and 550 as a result of step S620, the controller 130 may delete or discard the map data having the lowest hit count in the first and second buffers 510 and 550 at step S640. For example, when the plurality of segments 511 to 513 and 551 to 553 of the first and second buffers 510 and 550 have the map data having the hit counts of values "1", "5", "7", "2", "4" and "3", respectively, the controller 130 may delete the map data stored in the segment 511 and having the lowest hit count.

Then, at step S650, the controller 130 may store (or insert) the new map data into the segment, in which the map data was deleted at step S640. When the controller 130 stores the new map data into the segment, in which the map data was deleted, the controller 130 may initialize the hit count, which corresponds to the newly stored map data, to have a value of one (1). For example, when the controller 130 stores the new map data into the segment 511, the controller 130 may initialize the hit count, which corresponds to the newly stored map data of the segment 511, to have a value of one (1).

At step S660, the controller 130 may determine whether the segment storing the newly inserted map data is included in the first map buffer 510.

When it is determined the segment storing the newly inserted map data is included in the first map buffer 510 as a result of step S660, the controller 130 may swap the map data having the lowest hit count among the map data store in the segments 511 to 513 of the first map buffer 510 and the map data having the highest hit count among the map data stored in the segments 551 to 553 of the second map buffer 550 at step S670. When it is determined that the segment storing the new map data is included in the second map buffer 550 as a result of step S660, the controller 130 may end the process of storing the map data.

According to the process of storing the map data described with reference to FIG. 6, the first map buffer 510 may store the map data having a relatively higher hit count than the second map buffer 550. Thus, when the memory system 110 is in a foreground state, the controller 130 may manage the first and second buffers 510 and 550 such that first map buffer 510 stores the map data having the relatively higher hit count than the second map buffer 550.

Hereinafter, described will be a map buffer management operation of the controller 130 to the first and second buffers 510 and 550 when the memory system 110 is in a background state or the memory system 110 is in an idle state.

Figure 7:
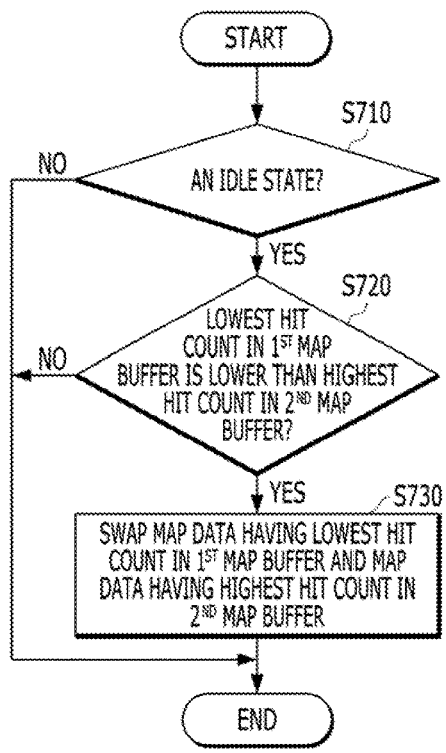
FIG. 7 is a flow chart illustrating an operation of a controller of FIG. 1.

FIG. 7 is a flow chart illustrating an operation of the controller 130 according to an embodiment of the present invention.

Referring to FIG. 7, the controller 130 may determine whether the memory system 110 is in an idle state at step S710. When it is determined that the memory system 110 is not in the idle state as a result of step S710, the controller 130 may end the map buffer management process.

When it is determined that the memory system 110 is in the idle state as a result of step S710, the controller 130 may determine whether the lowest hit count in the first map buffer 510 is lower than the highest hit count in the second map buffer 550 at step S720.

When it is determined that the lowest hit count in the first map buffer 510 is lower than the highest hit count in the second map buffer 550 as a result of step S720, the controller 130 may swap the map data having the lowest hit count among the map data store in the segments 511 to 513 of the first map buffer 510 and the map data having the highest hit count among the map data stored in the segments 551 to 553 of the second map buffer 550 at step S730. When it is determined that the lowest hit count in the first map buffer 510 is higher than the highest hit count in the second map buffer 550 as a result of step S720, the controller 130 may end the map buffer management process.

According to the map buffer management process described with reference to FIG. 7, the first map buffer 510 stores the map data having a relatively higher hit count than the second map buffer 550. That is, when the memory system 110 is in the idle state, the controller 130 may manage the first and second buffers 510 and 550 such that first map buffer 510 stores the map data having a relatively higher hit count than the second map buffer 550.

Although it is described above that the controller 130 performs the map buffer management process when the memory system 110 is in a foreground state and an idle state, the controller 130 may forcibly hold an operation corresponding to a foreground state or an idle state, and may perform the map buffer management process when required.

Hereinafter, described will be a map buffer management operation of the controller 130 to the first and second buffers 510 and 550 when the memory system 110 is in a background state and more specifically in a garbage collection (GC) state.

When the memory system 110 is in a garbage collection (GC) state, the controller 130 may delete the map data and the corresponding hit count stored in the segments 551 to 553 of the second map buffer 550, and may utilize the second map buffer 550 as a buffer for the garbage collection (GC) operation. In detail, the controller 130 may utilize the second map buffer 550 as a buffer for the garbage collection (GC) operation by moving the data stored in the memory blocks 0 to N−1 of the memory device 150 into the second map buffer 550 and by copying the moved data of the second buffer 550 into an arbitrary memory block. Accordingly, when the memory system 110 is in the garbage collection (GC) state, the controller 130 may perform the garbage collection (GC) operation more rapidly by storing data other than the map data into the second map buffer 550. Further, the controller 130 may process the command provided from the host 102 by using the map data stored in the first map buffer 510 more rapidly even when the state of the memory system 150 is changed from the background state to the foreground state and thus the controller 130 is required to process the provided command.

When the memory system 150 is in one of the wear leveling (WL) state, the map flush state and the bad block management state, the controller 130 may delete the map data and the corresponding hit count stored in the segments 551 to 553 of the second map buffer 550, and may utilize the second map buffer 550 as a buffer for the wear leveling (WL) operation, the map flush operation or the bad block management operation.

As described above, the memory system in accordance with an embodiment of the present invention may manage the first and second buffers 510 and 550 depending on the foreground state and the background state. Therefore, the memory system in accordance with an embodiment of the present invention may process the command provided from the host 102 more rapidly by utilizing both of the first and second buffers 510 and 550 during the foreground state of the memory system 150, and may process the background operation more rapidly by utilizing the second map buffer 550 as a buffer for the background operation.

FIGS. 8 to 13 are schematic diagrams illustrating application examples of the data processing system of FIG. 1.

Figure 8:
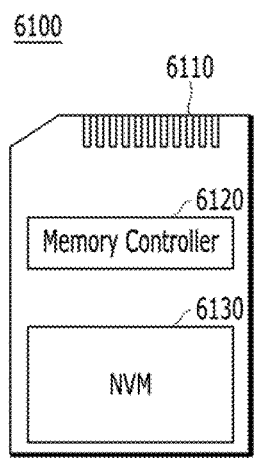
FIGS. 8 to 13 are schematic diagrams illustrating application examples of the data processing system of FIG. 1.

FIG. 8 is a diagram schematically illustrating another example of the data processing system including the memory system in accordance with the present embodiment. FIG. 8 schematically illustrates a memory card to which the memory system in accordance with the present embodiment is applied.

Referring to FIG. 8, the memory card 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 7, and the memory device 6130 may correspond to the memory device 150 of the memory system 110 described with reference to FIGS. 1 to 7.

Thus, the memory controller 6120 may include a RAM, a processing unit, a host interface, a memory interface and an error correction unit. The memory controller 130 may further include the elements shown in FIG. 5 and perform the operations described in reference to FIGS. 5-7.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may construct a solid state driver (SSD) by being integrated into a single semiconductor device. The memory card 6100 may be a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 9:
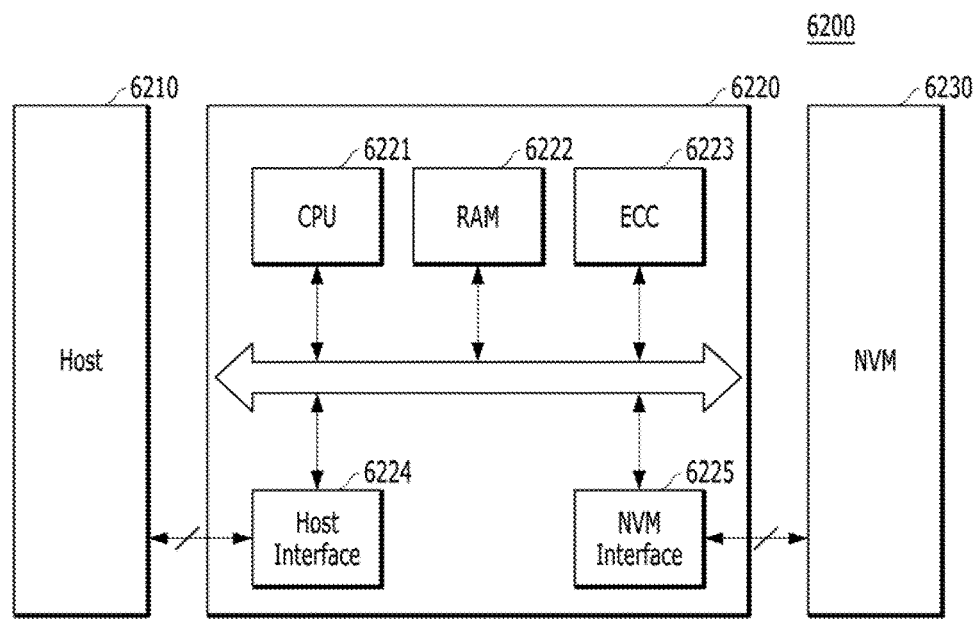

FIG. 9 is a diagram schematically illustrating another example of the data processing system including the memory system in accordance with the present embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 to 7, and the memory controller 6220 may correspond to the controller 130 in the memory system 110 illustrated in FIGS. 1 to 7.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 10:
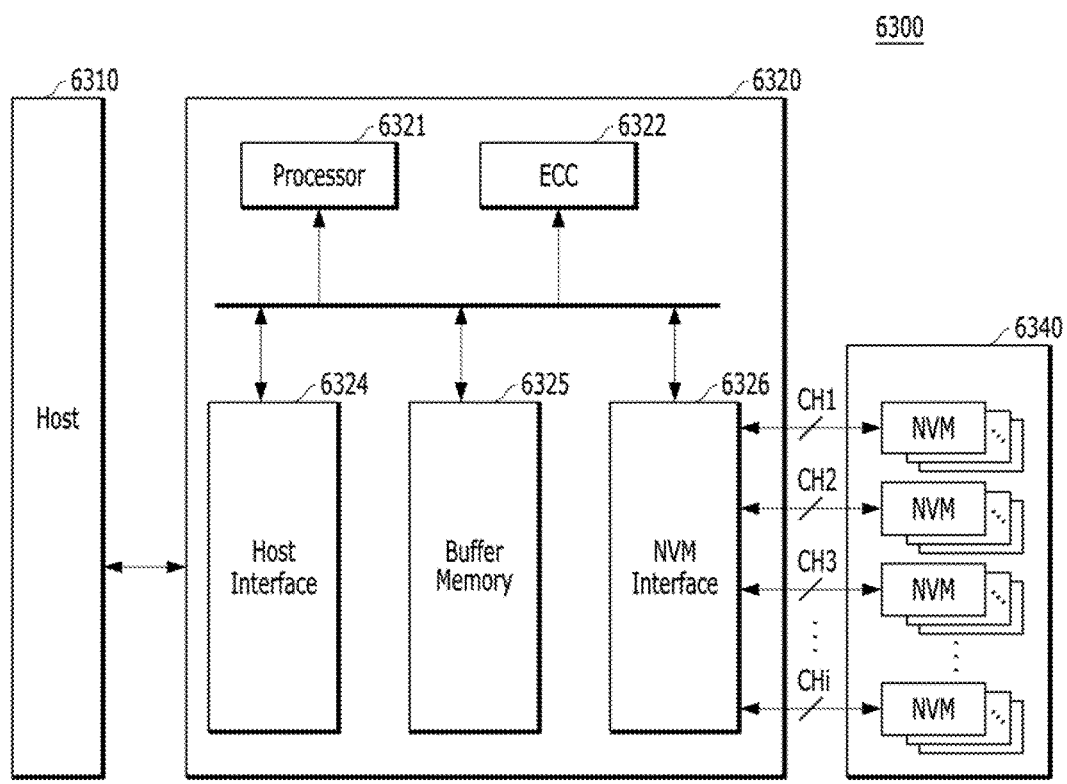

FIG. 10 is a diagram schematically illustrating another example of the data processing system including the memory system in accordance with the present embodiment. FIG. 10 schematically illustrates an SSD to which the memory system in accordance with the present embodiment is applied.

Referring to FIG. 10, the SSD 6300 may include a controller 6320 and a memory device 6340 including a plurality of nonvolatile memories. The controller 6320 may correspond to the controller 130 in the memory system 110 of FIGS. 1 to 7, and the memory device 6340 may correspond to the memory device 150 in the memory system of FIGS. 1 to 7.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 9 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 to 7 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 11:
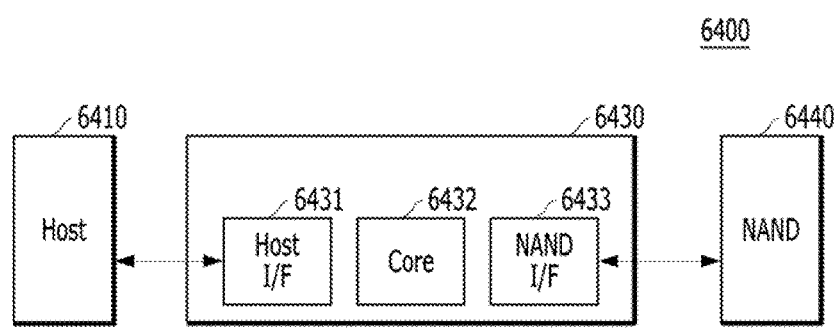
Figure 13:
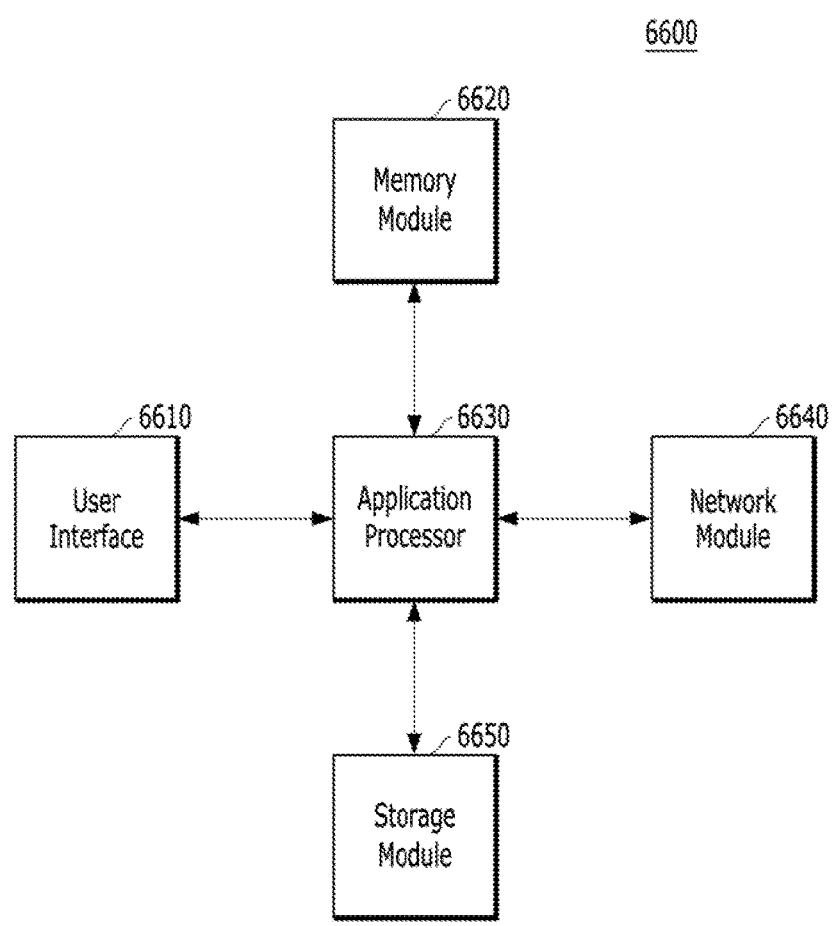

FIG. 11 is a diagram schematically illustrating another example of the data processing system including the memory system in accordance with the present embodiment. FIG. 13 schematically illustrates an embedded Multi-Media Card (eMMC) to which the memory system in accordance with the present embodiment is applied.

Referring to FIG. 11, the eMMC 6400 may include a controller 6430 and a memory device 6440 embodied by one or more NAND flash memories. The controller 6430 may correspond to the controller 130 in the memory system 110 of FIGS. 1 to 7, and the memory device 6440 may correspond to the memory device 150 in the memory system 110 of FIGS. 1 to 7.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS-I/UHS-II) interface.

Figure 12:
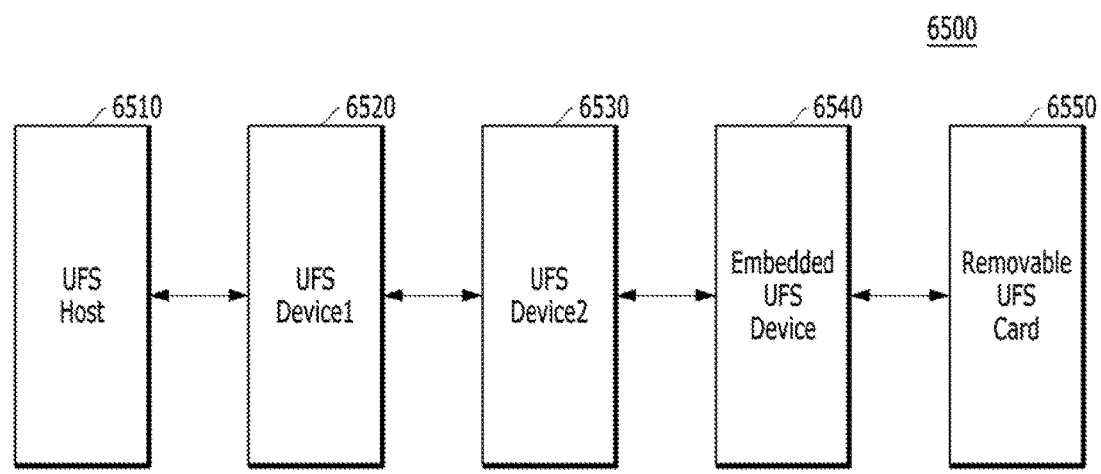

FIG. 12 is a diagram illustrating another example of a data processing system including a memory system according to an embodiment of the present invention. FIG. 12 is a drawing schematically illustrating a universal flash storage (UFS) to which the memory system according to an embodiment is applied.

Referring to FIG. 12, a UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 8. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

FIG. 13 is a diagram illustrating an example of a data processing system including the memory system according to an embodiment of the present invention. FIG. 13 is a drawing schematically illustrating a user system to which the memory system according to an embodiment is applied.

Referring to FIG. 13, a user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired/wireless electronic appliances, For example, a mobile electronic appliance. According to this fact, the memory system and the data processing system according to an embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 10 to 12.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

The memory system and the operating method thereof according to the embodiments may minimize complexity and performance deterioration of the memory system and maximize use efficiency of a memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A controller for a memory system, the controller comprising:
   a first map buffer and a second map buffer suitable for storing map data and hit counts respectively corresponding to the map data,
   wherein each of the hit counts represents a number of accesses to data stored in a memory device by using a corresponding one among the map data,
   wherein the controller swaps the map data and corresponding hit counts between the first and second map buffers such that the first map buffer stores relatively higher hit counts and corresponding map data than the second map buffer, wherein the controller swaps the lowest hit counts and corresponding map data of the first map buffer and the highest hit counts and corresponding map data of the second map buffer, and wherein the controller deletes the map data and corresponding hit counts from the second map buffer in order for the second map buffer to buffer data other than the map data and corresponding hit counts.

2. The controller of claim 1, wherein the controller swaps the map data and corresponding hit counts when a new hit count and corresponding map data are stored in the first map buffer.

3. The controller of claim 1, wherein the controller swaps the map data and corresponding hit counts during an idle state.

4. The controller of claim 1, wherein the controller deletes the map data and corresponding hit counts from the second map buffer in a background state.

5. The controller of claim 4, wherein the background state is one among states of a garbage collection operation, a wear leveling operation, a map flush operation and a bad block management operation.

6. An operation method of a controller, the method comprising:
- storing map data and hit counts respectively corresponding to the map data into a first map buffer and a second map buffer,
- swapping the map data and corresponding hit counts between the first and second map buffers such that the first map buffer stores relatively higher hit counts and corresponding map data than the second map buffer; and
- deleting the map data and corresponding hit counts from the second map buffer in order for the second map buffer to buffer data other than the map data and corresponding hit counts,
- wherein each of the hit counts represents a number of accesses to data stored in a memory device by using a corresponding one among the map data, and
- wherein the swapping of the map data and corresponding hit counts includes swapping the lowest hit counts and corresponding map data of the first map buffer and the highest hit counts and corresponding map data of the second map buffer.

7. The method of claim 6, wherein the swapping of the map data and corresponding hit counts is performed when a new hit count and corresponding map data are stored in the first map buffer.

8. The method of claim 6, wherein the swapping of the map data and corresponding hit counts is performed during an idle state.

9. The method of claim 6, the deleting of the map data and corresponding hit counts from the second map buffer is performed in a background state.

10. The method of claim 9, wherein the background state is one among states of a garbage collection operation, a wear leveling operation, a map flush operation and a bad block management operation.

11. A memory system comprising:
- a memory device suitable for storing data; and
- a controller,
- wherein the controller includes a first map buffer and a second map buffer suitable for storing map data and hit counts respectively corresponding to the map data,
- wherein the controller swaps the map data and corresponding hit counts between the first and second map buffers such that the first map buffer stores relatively higher hit counts and corresponding map data,
- wherein each of the hit counts represents a number of accesses to data stored in a memory device by using a corresponding one among the map data,
- wherein the controller swaps the lowest hit counts and corresponding map data of the first map buffer and the highest hit counts and corresponding map data of the second map buffer, and
- wherein the controller deletes the map data and corresponding hit counts from the second map buffer in order for the second map buffer to buffer data other than the map data and corresponding hit counts.

12. The memory system of claim 11, wherein the controller swaps the map data and corresponding hit counts when a new hit count and corresponding map data are stored in the first map buffer.

13. The memory system of claim 11, wherein the controller swaps the map data and corresponding hit counts during an idle state.

14. The memory system of claim 11, wherein the controller deletes the map data and corresponding hit counts from the second map buffer in a background state.

* * * * *